(12) United States Patent
Bean et al.

(10) Patent No.: US 8,674,216 B1
(45) Date of Patent: Mar. 18, 2014

(54) EARLY STREAMER EMISSION TERMINAL

(75) Inventors: Christopher A. Bean, Canton, NC (US); Woei Chiang Lee, Chai Wan (CN)

(73) Assignee: Alltec LLC, Canton, NC (US)

( * ) Notice: Subject to any disclaimer, the term of this patent is extended or adjusted under 35 U.S.C. 154(b) by 0 days.

(21) Appl. No.: 13/543,057

(22) Filed: Jul. 6, 2012
(Under 37 CFR 1.47)

Related U.S. Application Data (63) Continuation of application No. 12/823,854, filed on Jun. 25, 2010, now Pat. No. 8,232,472.

(51) Int. Cl.
*H02G 13/00* (2006.01)
(52) U.S. Cl.
USPC .......... 174/2; 174/3; 174/5 R; 174/6; 439/98; 361/117
(58) Field of Classification Search
USPC .............. 174/2, 3, 5 R, 5 G, 51; 439/98, 100; 361/216, 117
See application file for complete search history.

(56) References Cited

U.S. PATENT DOCUMENTS

| | | | |
|---|---|---|---|
| 4,760,213 A | 7/1988 | Gumley | |
| D305,309 S | 1/1990 | Heary | |
| D326,422 S | 5/1992 | Heary | |
| D339,307 S | 9/1993 | Heary | |
| 5,998,731 A * | 12/1999 | Takamura | 174/3 |
| 6,069,314 A | 5/2000 | Varela | |
| 6,320,119 B1 | 11/2001 | Gumley | |
| 6,597,559 B2 | 7/2003 | Betts | |
| 7,041,895 B1 | 5/2006 | Kim | |
| 7,265,961 B2 | 9/2007 | D'Alessandro | |
| 7,495,168 B2 | 2/2009 | Park | |

OTHER PUBLICATIONS

U.S. Notice of Allowance/Allowability dated May 29, 2012 in U.S. Appl. No. 12/823,854.
U.S. Supplemental Notice of Allowance/Allowability dated Jul. 2, 2012 in U.S. Appl. No. 12/823,854.
U.S. Notice of Allowance/Allowability dated Jun. 26, 2012 in U.S. Appl. No. 29/364,667.
U.S. Notice of Allowance/Allowability dated Oct. 16, 2013 in U.S. Appl. No. 29/432,967, filed Sep. 24, 2012, first named inventor: Christopher A. Bean.

\* cited by examiner

*Primary Examiner* — Dhirubhai R Patel
(74) *Attorney, Agent, or Firm* — Hope Baldauff, LLC (57) ABSTRACT

An early streamer emission terminal is disclosed. According to some embodiments, the early streamer emission terminal can create an upward propagating streamer earlier than conventional lightning protection systems and/or devices. In particular, the early streamer emission terminal can collect ground charges during an initial phase of thunderstorm development. When a thunderstorm begins to generate downward step leaders, the ambient electric field around a grounded lightning protection system can induce a current into the grounded lightning protection system. The induced current can include a flow of negative charge toward the ground, while a positive charge can be released to form an upward streamer. The construction of the early streamer emission terminal can trigger the flow of positive upward charge microseconds earlier than traditional lightning rods or other similar devices.

19 Claims, 9 Drawing Sheets

EARLY STREAMER EMISSION TERMINAL

CROSS REFERENCE TO RELATED APPLICATION

This patent application is a continuation of and claims priority to U.S. patent application Ser. No. 12/823,854, entitled "Early Streamer Emission Terminal," filed on Jun. 25, 2010, now U.S. Pat. No. 8,232,472 issued Jul. 31, 2012, the entirety of which is hereby incorporated by reference in its entirety.

BACKGROUND

Some lightning discharge control systems and/or devices rely upon creating a large ground charge, for example via a lightning rod or other similar device. According to this approach, the highest potential ground charge, and therefore hopefully the lightning strike, occurs at a controlled location. These systems and devices are not foolproof, can attract lightning to facilities at which the lightning rods or other devices are placed, and can fail to prevent lightning discharge at or near sensitive locations and/or people.

As step leaders begin forming in a storm cloud, the corona process can begin at grounded conductors such as conventional lightning rods. During this process, ion formation begins at the lightning rod. As the ions repel from each other and disperse in all directions away from the lightning rod, electrons left behind begin to flow to the ground, thereby neutralizing positive charges in the ground. Eventually, the lightning rod reaches a saturation point at which the lightning rod can no longer dissipate the charge fast enough to keep up with the charge accumulation. Meanwhile, streamers begin to form, effectively causing the lightning rods to attract lightning strikes.

Because of the charge dissipation described above, however, the ground charges that develop streamers attracting a lightning strike no longer have sufficient electrical energy to initiate the upward streamer needed to control the path of the lightning. As such, a downward travelling step leader may be attracted to an object with potential higher than the lightning rod, and therefore may strike a target other than the lightning rod.

It is with respect to these and other considerations that the disclosure made herein is presented.

SUMMARY

The present disclosure is directed to an early streamer emission terminal. According to the concepts and technologies disclosed herein, an early streamer emission terminal creates an upward propagating streamer earlier than a conventional lightning prevention system or device. In particular, the early streamer emission terminal collects ground charges during an initial phase of thunderstorm development. When a thunderstorm begins to generate downward step leaders, the ambient electric field intensity around a grounded lightning protection system induces current into the grounded lightning protection system. The induced current is a flow of negative charge toward the ground, while a positive charge is released to form an upward streamer. The construction of the early streamer emission terminal triggers the flow of positive upward charge microseconds earlier than traditional lightning rods or other similar devices.

According to an aspect, an early streamer emission terminal includes a number of charge plates separated by insulator seals such that each of the charge plates operates independently. The charge plates are coupled to upper electrodes carried by an upper assembly, and to lower electrodes carried by a lower assembly. The upper assembly and the lower assembly are connected to a central shaft having a sleeve portion and a central terminal portion. Upper electrodes disposed in the upper assembly and lower electrodes disposed in the lower assembly are placed proximate to, but not touching, the central shaft. Furthermore, the upper electrodes and the lower electrodes are conductively coupled to the charge plates.

During a thunderstorm, atmospheric charge accumulates in the charge plates, and a ground charge accumulates in the shaft. Because of a gap between the upper and lower electrodes and the central shaft, the atmospheric charge in the emission terminal does not discharge into the central shaft and/or from the shaft into the ground. Eventually, the charge in the charge plates reaches a point at which an arc between the electrodes and the central shaft occurs. When the discharge occurs, the emission terminal generates a quickly moving upward streamer. Thus, the emission streamer disclosed herein is configured to control where lightning occurs by generating a quickly moving upward streamer as downward traveling step leaders are being formed.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to an early streamer emission terminal. According to various embodiments, the early streamer emission terminal creates an upward propagating streamer earlier than conventional lightning prevention systems and/or devices. The early streamer emission terminal collects ground charges during an initial phase of a thunderstorm. When a thunderstorm begins to generate downward step leaders, the ambient electric field intensity around the early streamer emission terminal intensifies, causing the ground charge to be released and forming an upward streamer microseconds earlier than traditional lightning rods or other similar devices.

In one embodiment, the early streamer emission terminal includes a number of charge plates, a central shaft, and upper and lower assemblies. Respective electrodes located at the upper and lower assemblies are electrically coupled to upper and lower brackets connected to the charge plates. A gap is maintained between the shaft and the ends of the electrodes. During a thunderstorm, atmospheric change accumulates at the charge plates and ground charge accumulates at the shaft. Eventually, the charge in the charge plates arcs across the gaps and the early streamer emission terminal generates a quickly moving upward streamer. When a step leader from a storm cloud begins approaching the earth, the highest potential may be the upward-moving streamer, thereby attracting a lightning strike through the controlled area and/or devices.

In the following detailed description, references are made to the accompanying drawings that form a part hereof, and in which are shown by way of illustration specific embodiments or examples. It must be understood that the disclosed embodiments are merely illustrative of the concepts and technologies disclosed herein. The concepts and technologies disclosed herein may be embodied in various and alternative forms, and/or in various combinations of the embodiments disclosed herein. The word "illustrative," as used in the specification, is used expansively to refer to embodiments that serve as an illustration, specimen, model or pattern.

Additionally, it should be understood that the drawings are not necessarily to scale, and that some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure. Referring now to the drawings, in which like numerals represent like elements throughout the several figures, aspects of an early streamer emission terminal will be presented.

Figure 1:
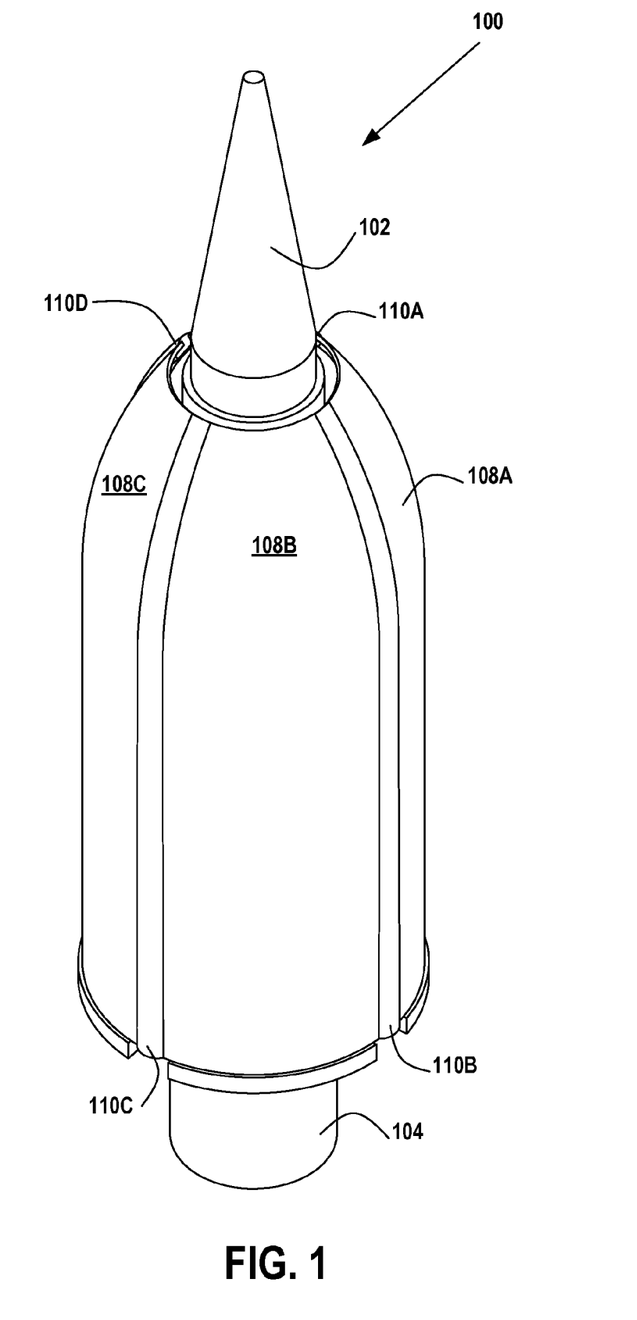
FIG. 1 is a perspective view illustrating an early streamer emission terminal, according to an illustrative embodiment.

FIG. 1 is a perspective view illustrating an early streamer emission terminal 100 ("emission terminal"), according to an illustrative embodiment. The emission terminal 100 includes a shaft 102. According to various embodiments, the shaft 102 serves as a backbone or central component to which other components of the emission terminal 100 are connected. Additionally, the shaft 102 provides additional functionality as described herein. The shaft 102 is illustrated and described in more detail below with reference to FIGS. 5A-5B.

The emission terminal 100 also includes a lower electrode assembly 104 ("lower assembly"), a portion of which is visible in FIG. 1, and an upper electrode assembly ("upper assembly") that is not visible in FIG. 1. The emission terminal 100 also includes two or more charge accumulation plates 108A-D ("charge plates"), and two or more insulator seals 110A-D ("seals") disposed between the charge plates 108. The seals 110 can be used to electrically isolate each of the charge plates 108 from one another.

The lower assembly 104 and the upper assembly can support the charge plates 108, and can maintain the charge plates 108 at a desired position and/or configuration relative to the shaft 102. The lower assembly 104 and the upper assembly also function as insulators that insulate the charge plates 108 from the shaft 102. Additionally, the lower assembly 104 and the upper assembly function as carrier assemblies for one or more electrodes (not visible in FIG. 1) that are conductively connected to the charge plates 108 and located proximate to, but not in contact with, the shaft 102, as will be explained in more detail herein. The lower assembly 104 and the upper assembly are described in more detail herein, particularly with reference to FIGS. 3A-4B, and the charge plates 108 and the seals 110 are described in more detail herein, particularly with reference to FIG. 6.

The illustrated embodiment of the emission terminal 100 includes four charge plates 108 and four seals 110. Some embodiments of the emission terminal 100 include more or less than four charge plates 108 and more or less than four seals 110. The number of charge plates 108 and the number of seals 110 included in the emission terminal 100 can be varied based upon design preferences, material needs, marketing or manufacturing considerations, aesthetic considerations, and the like. Therefore, it should be understood that the illustrated embodiment is illustrative and should not be construed as being limiting in any way.

The charge plates 108 of the illustrated emission terminal 100 collectively exhibit a generally cylindrical shape that is tapered toward the shaft 102. The general shape of the emission terminal 100 can be varied depending upon manufacturing, aesthetic, performance, and/or other considerations. Thus, the illustrated shape and configuration should be understood as being illustrative of the concepts and technologies disclosed herein, and not as being limiting in any way.

In one embodiment, the charge plates 108 are about 1.0 mm thick (~0.04 inches), and about 174.98 mm (~6.89 inches) tall from top to bottom. When arranged as illustrated in FIG. 1, the outside diameter of the charge plates 108 is about 88 mm (~3.47 inches) at the bottom of the emission terminal 100, and the outside diameter of the charge plates 108 is about 18.65 mm (~0.73 inches) at the top of the emission terminal 100. It should be understood that these dimensions are illustrative, and that other dimensions and configurations for the charge plates 108 are possible and are contemplated.

In one embodiment, the shaft 102, and therefore the emission terminal 100, is about 328.5 mm (~12.93 inches) from top to bottom. In another embodiment, the shaft 102 has an outside diameter of about 28 mm (~1.10 inches) and an inside diameter of about 16 mm (~0.629 inches). A substantially conical terminal portion of the shaft 102 emerges from between the tapered tops of the charge plates 108, and extends away from the charge plates 108. It should be understood that these dimensions are illustrative, and that other dimensions and configurations for the shaft 102 are possible and are contemplated.

The seals 110 are visible between the charge plates 108. According to one embodiment, a gap of about 3.5 mm (~0.138 inches) is maintained between the charge plates 108. The seals 110 are about 14 mm wide (~0.55 inches) at their widest point, but are only 3.5 mm wide at their narrowest point, as mentioned above. It should be understood that these dimensions are illustrative, and that other dimensions and configurations for the seals 110 are possible and are contemplated.

Although not illustrated in FIG. 1, it should be understood that additional hardware can be used to mount the emission terminal 100 in a desired location, configuration, and/or position. For most applications, the emission terminal 100 is mounted such that the illustrated shaft 102 is arranged with the tapered end pointing toward the sky. According to various implementations, the shaft 102 is mechanically and electrically coupled to a mounting bracket, which in turn is electrically connected to ground. Therefore, although not illustrated in FIG. 1, it should be understood that the emission terminal 100 can include, or can be configured to engage, mounting mechanisms and/or devices such as mounting adaptors, masts, poles, ground wires, brackets, and the like.

Figure 2:
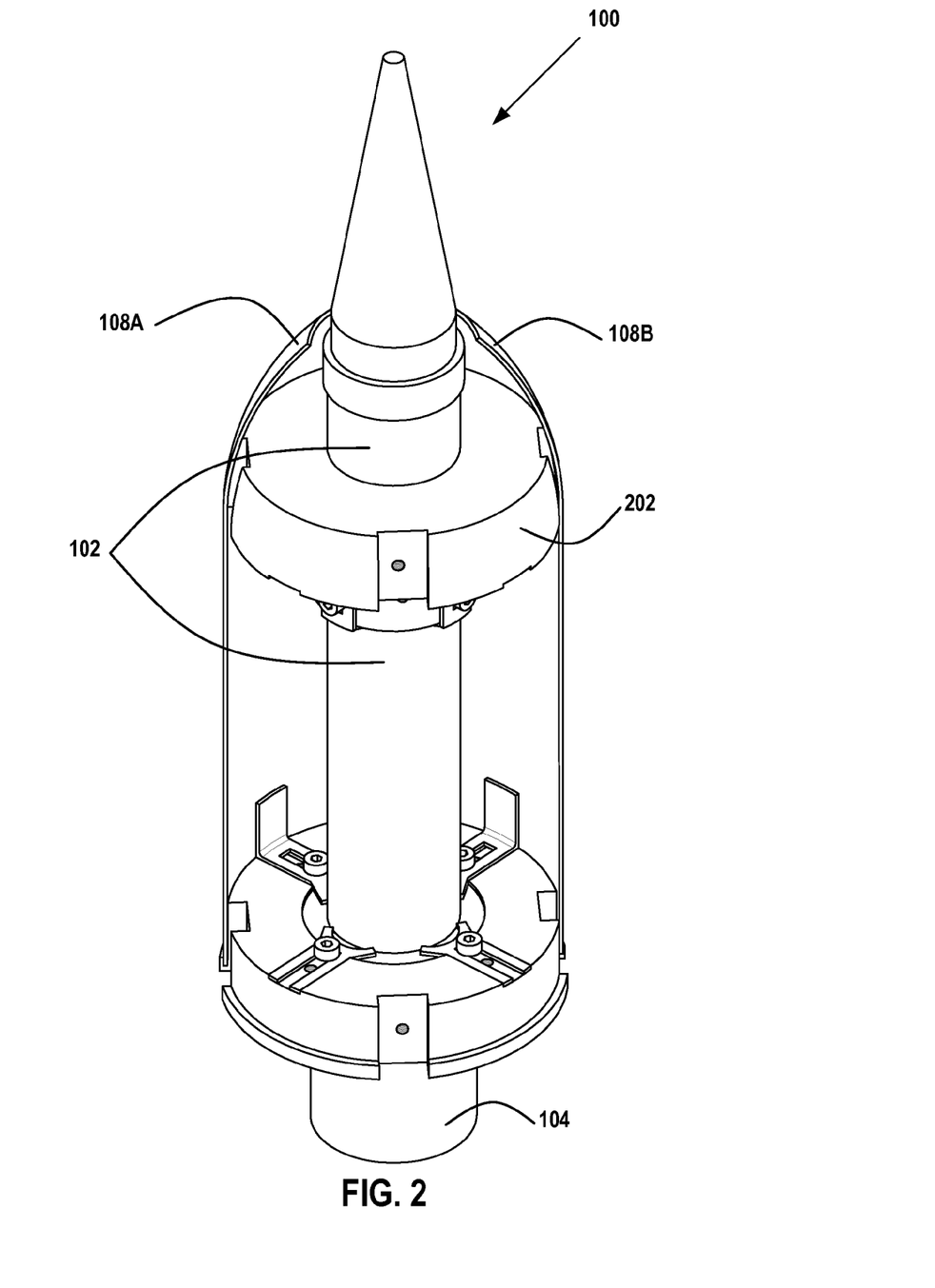
FIG. 2 is a perspective view illustrating a partially disassembled early streamer emission terminal, according to an illustrative embodiment.

Turning now to FIG. 2, a perspective view of a partially disassembled emission terminal 100 is illustrated, according to an illustrative embodiment. In FIG. 2, two of the charge plates 108C, 108D and three of the seals 110A, 110C-D have been removed from the emission terminal 100. In FIG. 2, removal of these components has exposed more of the shaft 102 and the lower assembly 104, as well as the upper assembly 202, all of which now are visible in FIG. 2. The components of the shaft 102, the lower assembly 104, and the upper assembly 202, as well as the respective functions of these and other components of the emission terminal 100, are described in more detail herein.

Figure 3A:
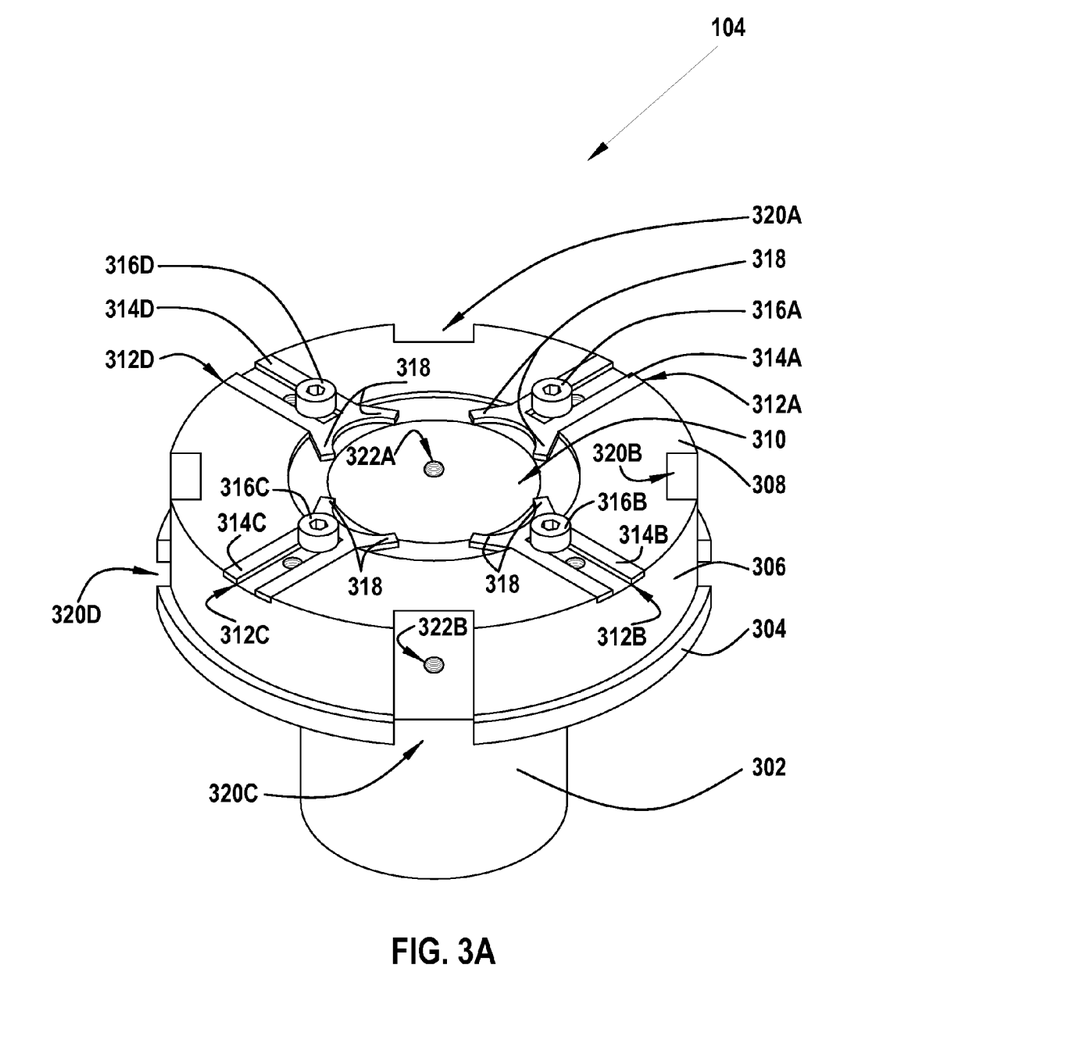
FIGS. 3A-3B are perspective views illustrating a lower assembly of the early streamer emission terminal, according to an illustrative embodiment.

Turning now to FIG. 3A, a perspective view of the lower assembly 104 is illustrated according to an illustrative embodiment. The lower assembly 104 includes a lower assembly body portion 302 ("lower body"). The lower body 302 can be formed from any suitable material including, but not limited to, plastics, polymers, epoxy resins, fiberglass, other materials, and/or combinations thereof. In some embodiments, the lower body 302 is formed from a non-conductive halogen- and phosphorous-free epoxy resin such as a copolyamide made from PA 6 and PA 66 (PA 66/6). Some suitable examples of the epoxy resin are sold by BASF GmbH of Leuna, Germany under various trademarks and trade names including, but limited to, MIRAMID, MAXAMID, MURYLON, MAZMID, MAPEX, and/or other marks. In some embodiments, the lower assembly 104 is formed from an epoxy resin or another material using an injection molding process. It should be understood that other manufacturing techniques are possible, and are contemplated.

In the illustrated embodiment, the lower body 302 includes a lip 304. The lip 304 can be dimensioned and configured to contact and/or support respective bottom edges of the charge plates 108. The lower body 302 also can include a sidewall 306 for contacting and/or supporting inner surfaces of the respective charge plates 108. The lower body 302 also can include a top surface 308 at which various components of the lower assembly 102 are disposed and/or connected to the lower assembly 102.

Although the lower body 302 is illustrated as a single piece of material, it should be understood that the lower assembly 104 can be formed from one or more pieces of material. In some embodiments, the lower body 302 is formed from two or more components that are sealed or joined together using a thermoform process, mechanical fasteners, and/or mechanical or chemical adhesives. Therefore, the illustrated embodiment is illustrative and should not be construed as being limiting in any way.

The lower assembly 104 includes a main lower assembly aperture 310 ("lower aperture"). The lower aperture 310 can be formed through the lower assembly 104 such that the lower aperture 310 is formed through the top surface 308, continues through the lower body 302, and continues to and through a bottom surface (not visible in FIG. 3A) of the lower body 302. According to some embodiments, the lower aperture 310 is dimensioned to accommodate the shaft 102, which may be passed through the main aperture 310, and thereby through the entire lower assembly 104.

The lower assembly 104 also includes a number of electrode retention positioning slots 312A-D ("lower electrode slots"). The lower electrode slots 312 are dimensioned and configured to accommodate a one or more electrodes 314A-D ("lower electrodes"). Although four lower electrode slots 312 and four lower electrodes 314 are illustrated in FIG. 3A, it should be understood that more or fewer lower electrode slots 312 and more or fewer lower electrodes 314 can be included. Furthermore, it should be understood that the respective numbers of lower electrode slots 312 and lower electrodes 314 are not necessarily the same in all implementations.

The lower electrodes 314 can be dimensioned and configured to nest in and be aligned by the lower electrode slots 312, if desired. The lower electrodes 314 can be formed from any suitable material including, but not limited to, metallic and non-metallic conductors such as copper, aluminum, steel, gold, silver, graphite, combinations thereof, and the like. The lower electrodes 314 can be secured in a desired operating position by respective adjustment mechanisms 316A-D ("lower adjustment mechanisms"). Although the lower adjustment mechanisms 316 are illustrated in FIG. 3A as screws, it should be understood that other mechanisms are possible and are contemplated. In some embodiments, for example, the lower electrodes 314 are formed as part of the lower assembly 104, and therefore do not require the lower attachment mechanisms 316 to be attached to the lower assembly 104. The illustrated embodiment is illustrative, and should not be construed as being limiting in any way.

In the illustrated embodiment, the lower electrodes 314 are slotted and have a Y-shape that includes two electrode branches 318 ("branches"). The lower electrodes 314 can be slotted to allow eased assembly of the lower assembly 104, as well as for providing an ability to adjust the position and configuration of the components of the lower assembly 104. For example, the illustrated design can be used to allow the lower electrodes 314 to slide toward and/or away from the lower aperture 310 and/or the shaft 102. It should be understood that the lower electrodes 314 can include a throughhole, pin, or other mechanism instead of, or in addition to, the illustrated slots. It also should be understood that the branches 318 are optional, and are not necessarily included in all embodiments. The branches 318 are included in the illustrated embodiment to provide the electrode 314 with two points at which an arc between the lower electrodes 314 and the shaft 102 can be formed. Thus, the branches 318 may potentially increase or decrease the accumulated charge required at the lower electrodes 314 to create an arc between the lower electrodes 314 and the shaft 102.

The lower assembly 104 also includes four charge plate positioning slots 320A-D ("lower positioning slots"). The lower positioning slots 320 can be provided, if desired, to simplify assembly of the emission terminal 100 and/or to simplify replacement and/or removal of components of the emission terminal 100. In some embodiments, the lower positioning slots 320 align with the seals 110, though this is not necessarily the case. In the illustrated embodiment, the lower assembly 104 includes four lower positioning slots 320. As mentioned above with reference to FIG. 1, the emission terminal 100 can include more or fewer than four charge plates 108. Thus, it should be understood that the emission terminal 100 can include more or fewer than four lower positioning slots 320, if desired.

The lower assembly 104 also includes two apertures 322A-B. The apertures 322 accommodate one or more positioning mechanisms such as set screws, cotter pins, clips, and/or other mechanisms (not illustrated). In some embodiments, the apertures 322 are omitted, and the lower assembly 104 is secured in position on the shaft 102 using adhesives, welds, and/or other materials and/or mechanisms. In some embodiments, an aperture 322 is formed at each of the lower positioning slots 320. In other embodiments, the lower assembly 104 includes two apertures 322, with one aperture formed at each of two lower positioning slots 320, which can be opposite or adjacent one another. According to some embodiments, the apertures 322 are accessible before placing the seals 110 in place, and/or by removing the seals 110 from the emission terminal 100. It should be understood that the illustrated apertures 322 and their respective positions are illustrative. Additional and/or alternative positioning mechanisms and configurations are possible and are contemplated.

Figure 3B:
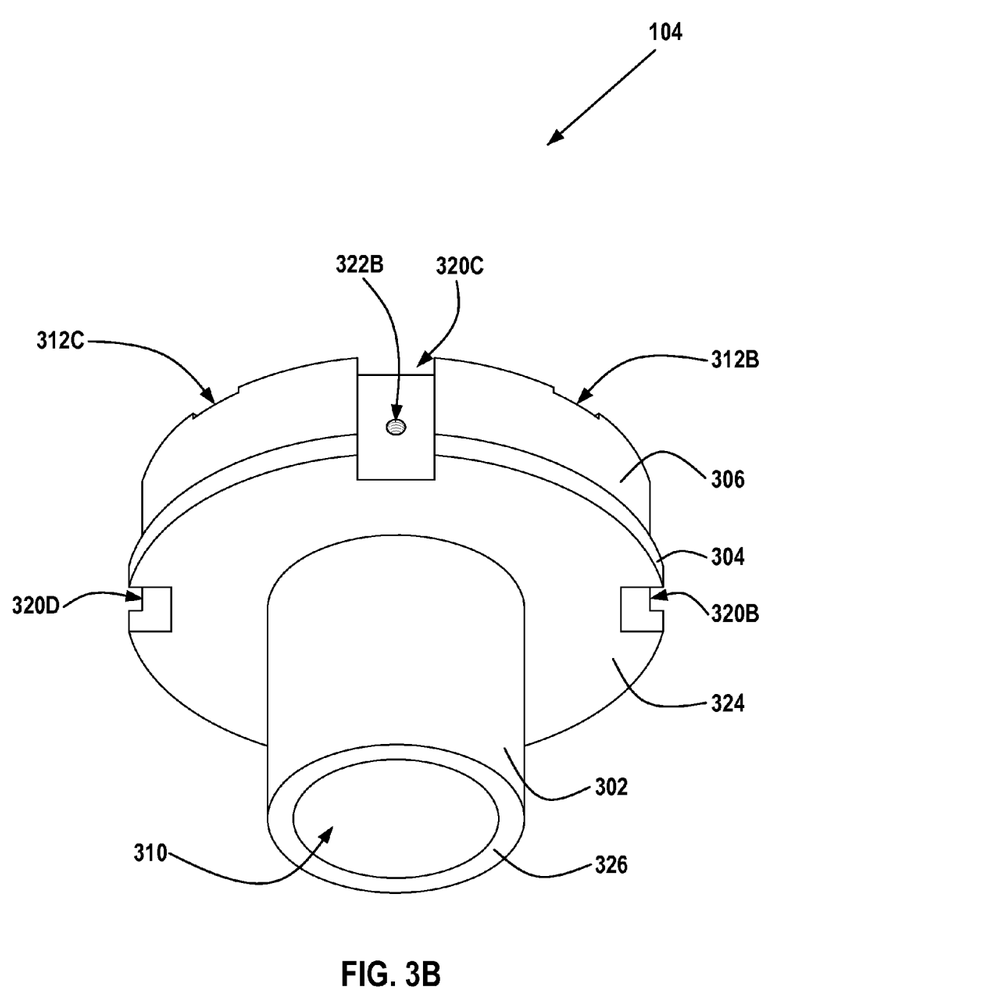

Turning now to FIG. 3B, another perspective view of the lower assembly 104 is illustrated, according to an illustrative embodiment. In FIG. 3B, a support surface 324 is visible. In the illustrated embodiment, the support surface 324 remains exposed after the emission terminal 100 is assembled, though this is not necessarily the case. The lower assembly 104 also includes a lower surface 326 through which the main aperture 310 passes. Other components of the lower assembly 104 illustrated in FIG. 3B are labeled in a manner consistent with FIG. 3A.

Figure 4A:
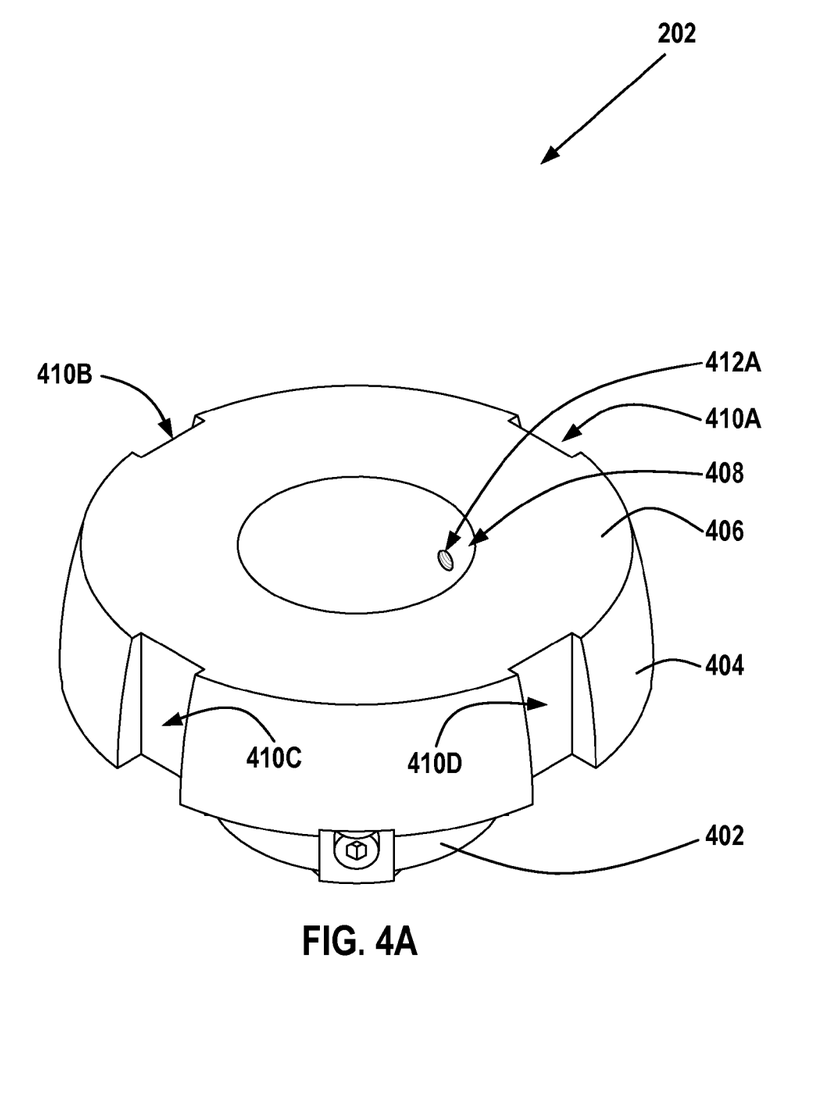
FIGS. 4A-4B are perspective views illustrating an upper assembly of the early streamer emission terminal, according to an illustrative embodiment.

Turning now to FIG. 4A, a perspective view of the upper assembly 202 is illustrated, according to an illustrative embodiment. The upper assembly 202 includes a body portion 402 ("upper body"). The upper body 402 can be formed from any suitable material including, but not limited to, one or more materials used to form the lower assembly 104, as described above with reference to FIGS. 3A-3B. The upper assembly 202 includes a sidewall 404 for supporting inner surfaces of respective charge plates 108. It therefore will be appreciated that the lower assembly 104 and the upper assembly 202 can cooperate with one another to support the charge plates 108 in a desired orientation, though this is not necessarily the case.

The upper assembly 202 further includes a top surface 406. The upper assembly includes a main upper assembly aperture 408 ("upper aperture") that is formed in the upper assembly 202. The upper aperture 408 can be formed such that the upper aperture 408 passes through the top surface 406, through the upper assembly 202, and through a bottom surface (not visible in FIG. 4A) of the upper assembly 202. As mentioned above, and as illustrated in FIG. 2, the shaft 102 can pass through the upper assembly 202 by way of the upper aperture 408.

The upper assembly 202 also includes a number of accumulator positioning slots 410A-D ("upper positioning slots"). The upper assembly 202 also includes one or more attachment mechanisms such as an aperture 412A. The attachment mechanism 412A is configured to accommodate one or more set screws or other mechanisms, as explained above with reference to the apertures 322 illustrated in FIGS. 3A-3B.

Figure 4B:
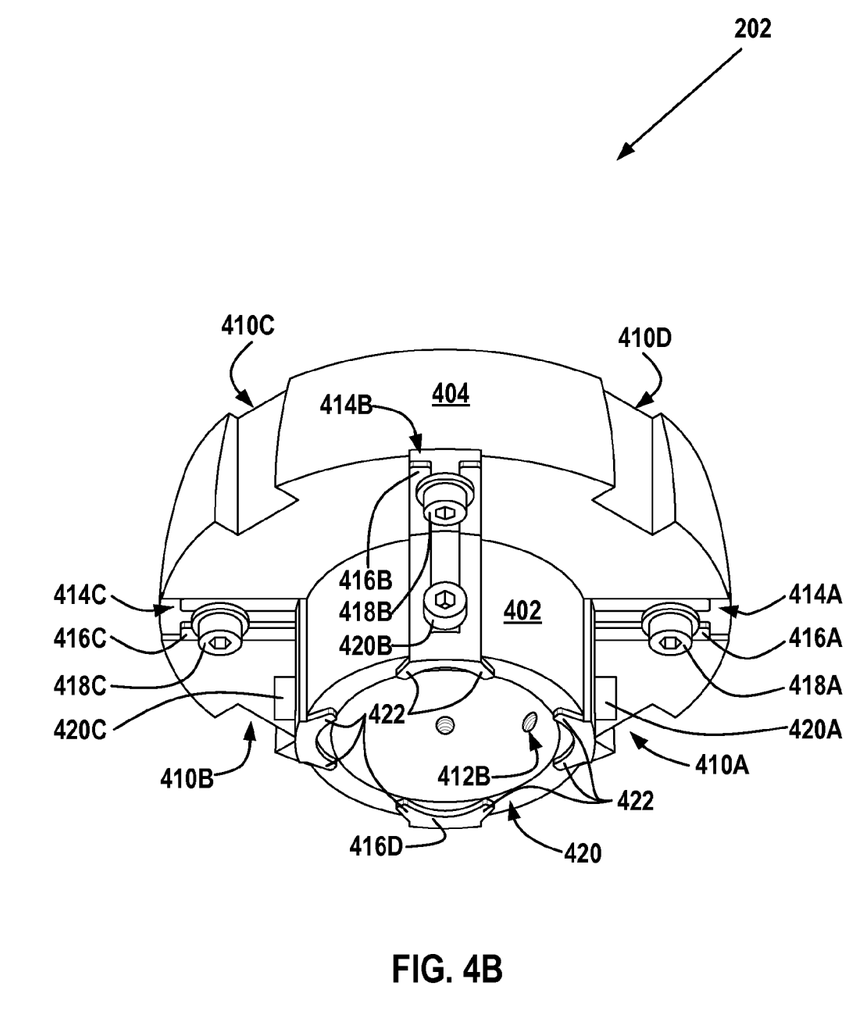

Turning now to FIG. 4B, another perspective view of the upper assembly 202 is illustrated, according to an illustrative embodiment. The upper assembly 202 includes a number of streamer initiator electrode retention positioning slots 414A-D ("upper positioning slots"). The upper positioning slots 414 are configured and dimensioned to accommodate the one or more electrodes 416A-D ("upper electrodes"). Although four upper positioning slots 414 and four upper electrodes 416 are illustrated in FIG. 4B, it should be understood that more or fewer upper positioning slots 414 and more or fewer upper electrodes 416 can be included. Furthermore, it should be appreciated that respective numbers of upper electrode slots 414 and upper electrodes 416 are not necessarily the same in all implementations.

The upper electrodes 416 can be configured and dimensioned to nest in and be aligned into an operating position by the upper electrode slots 414, if desired. As mentioned above, the upper electrodes 416 can be formed from any suitable materials including, but not limited to, the materials set forth above with respect to the lower electrodes 314 in FIG. 3A. The upper electrodes 416 can be secured in a desired operating position by respective adjustment mechanisms 418A-D (418D is not visible in FIG. 4B) and 420A-D (420D is not visible in FIG. 4B). As mentioned above with respect to the adjustment mechanisms 316 of FIGS. 3A-3B, the illustrated screws are but one illustrative embodiment of adjustment mechanisms 418, 420, and should not be construed as being limiting in any way.

The upper electrodes 416 are illustrated as being slotted. It should be understood, however, that this is not necessarily the case. The illustrated embodiment of the upper electrodes 416 are one embodiment, wherein the position of the upper electrodes 416 can be adjusted by sliding the upper electrodes 416 along their respective upper positioning slots 414, and securing the upper electrodes 416 in a desired orientation by securing the adjustment mechanisms 418, 420. In various embodiments, the upper electrodes 416 are formed without a slot. In some embodiments, the upper electrodes 416 include one or more throughholes through which a securing mechanism is passed to secure the upper electrodes 416 in place. Similarly, as mentioned above, the upper electrodes 416 can be formed as a part of the upper assembly 202 and/or can be joined to the upper assembly 202 by way of thermal, mechanical, and/or chemical processes.

In the illustrated embodiment, each of the upper electrodes 416 has a Y-shape that includes two electrode branches 422. It should be understood that the electrode branches 422 are optional, and are not necessarily included in all embodiments. The electrode branches 422 are included in the illustrated embodiments to provide two points at which an arc between the upper electrodes 416 and the shaft 102 may form. Thus, the electrode branches 422 potentially may increase or decrease the accumulated charge required at the upper electrodes 416 to create an arc between the upper electrodes 416 and the shaft 102.

Figure 5A:
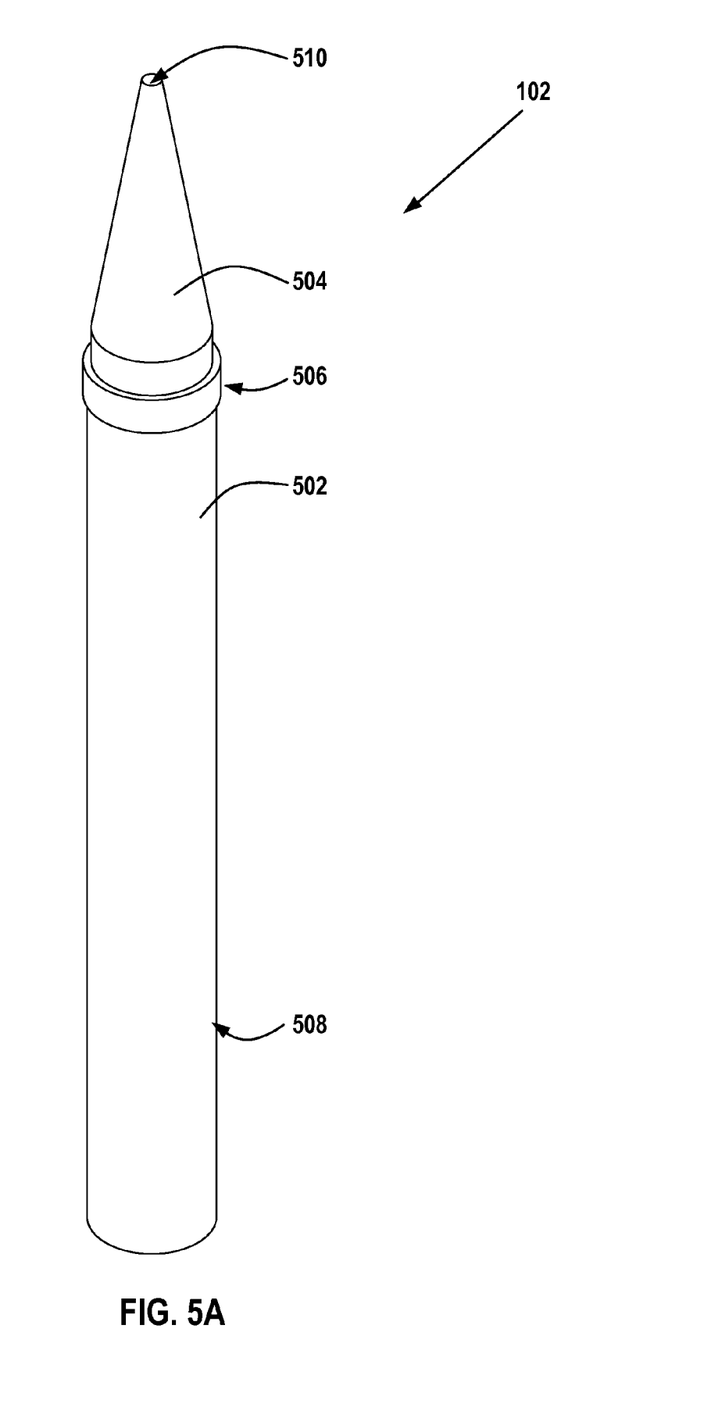
FIGS. 5A-5B are perspective views illustrating the shaft of the early streamer emission terminal, according to an illustrative embodiment.

Turning now to FIG. 5A, a perspective view of the shaft 102 is illustrated, according to an illustrative embodiment. As illustrated in FIG. 5A, the shaft 102 includes a sleeve portion 502. According to various embodiments, the lower assembly 104 and the top assembly 202 are attached to the sleeve portion 502. It will be appreciated from the description of FIGS. 3A-4B that the lower assembly 104 and/or the upper assembly 202 can be put into position along the shaft 102, and secured in place by attachment mechanisms such as, for example, set screws, bolts, pins, rivets, clips, hooks, adhesives, other mechanisms, and combinations thereof.

The shaft 102 also includes a central streamer initiation electrode portion 504 ("central electrode"). In the illustrated embodiment, the central electrode 504 is illustrated as being substantially conical. It should be understood that this embodiment is illustrative, and that the central electrode 504 can have other shapes and/or configurations.

According to various embodiments, the shaft 102 is formed from one piece of material, while in other embodiments, the shaft 102 is formed from two or more pieces of material. In the illustrated embodiment, the sleeve portion 502 of the shaft 102 is formed from one piece of stainless steel. The sleeve portion 502 has female threads at a top end 506 and at a bottom end 508. The threads at the bottom end 508 are visible in FIG. 5B. The central electrode 504 has male threads (not visible in FIGS. 5A-5B) that engage the female threads located at the top end 506 of the sleeve portion 502 of the shaft 102. In some embodiments, the central electrode 504 can be removed and/or replaced at any time.

The central electrode 504 also includes a tip 510. In general, the tip 510 may provide the emission terminal 100 with a point discharge effect by providing a point at which a high potential forms at the emission terminal 100. According to various embodiments, the shape of the tip 510 is varied according to design, manufacturing, aesthetic, performance, and/or other considerations. For example, the tip 510 can be configured to include one or more shapes to increase or decrease the number of high potential points at the tip 510, and/or to vary the shape or appearance of the tip 510 to accommodate aesthetic, safety, and/or performance considerations. As such, the illustrated embodiment is illustrative, and should not be construed as being limiting in any way.

Figure 5B:
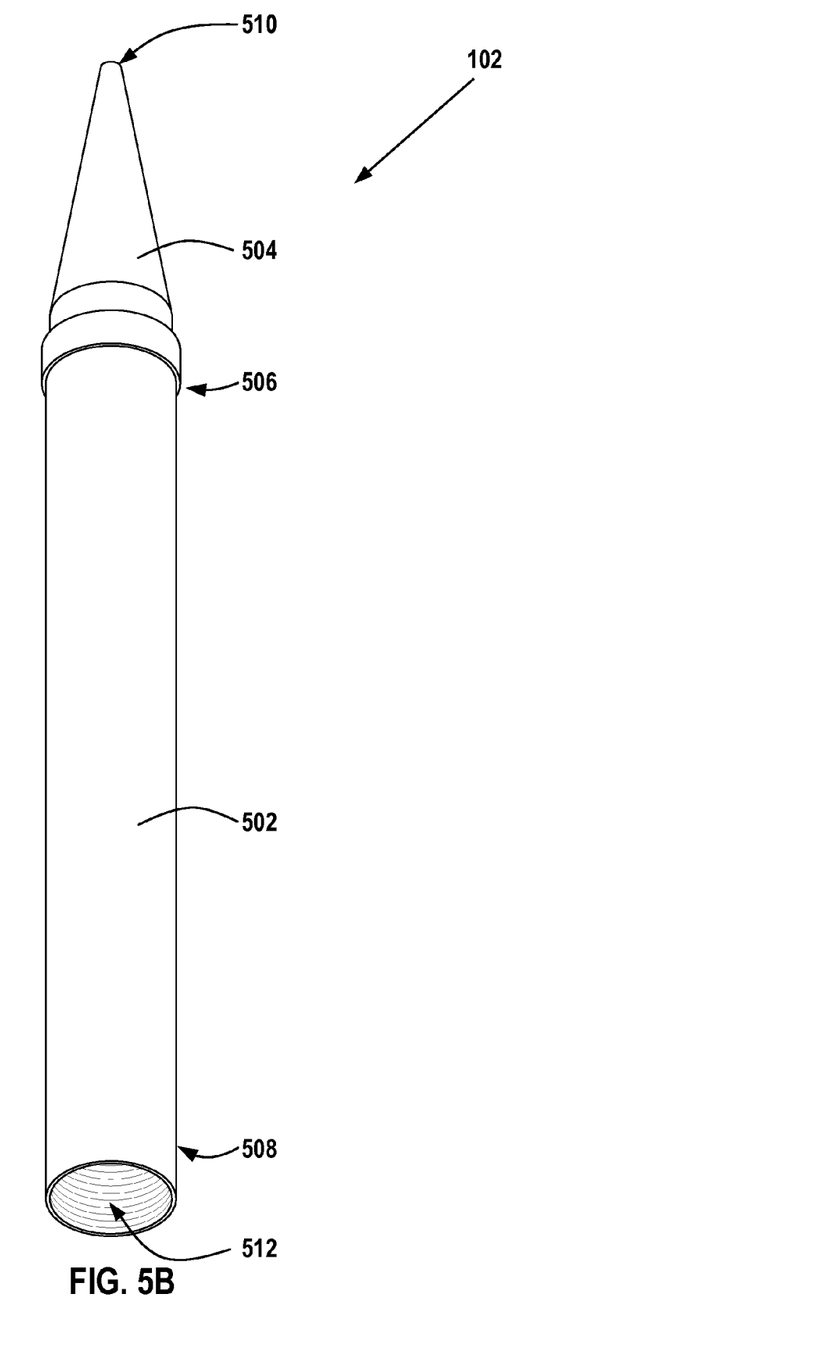

Turning now to FIG. 5B, another perspective view of the shaft 102 is illustrated, according to an illustrative embodiment. As illustrated in FIG. 5B, the female threads 512 ("threads") are visible at the bottom end 508 of the sleeve portion 502 of the shaft 102. The threads 512 can be used to attach the shaft 102, and thereby the emission terminal 100 to a suitable mounting bracket, pole, adapter, and/or another device. It should be understood that illustrated threads 512 are illustrative of one attachment mechanism that can be used to attach the emission terminal 100 to another surface or device. Other attachment mechanisms are contemplated and are possible.

In the illustrated embodiment, the sleeve portion 502 is formed as a substantially hollow tube, and is filled with a thermally dissipative material. According to various embodiments, the thermally dissipative material used to fill the sleeve portion 502 is thermally conductive and can be, but is not necessarily, electrically conductive. The material used to fill the sleeve portion 502 can serve several purposes. First, the thermally dissipative material can dissipate heat from the surfaces of the emission terminal 100. Additionally, the thermally dissipative material can include a material that hardens upon setting. As such, the emission terminal 100 can be provided with additional structure by the thermally dissipative material, and the parts of the emission terminal 100 can be held in place by the thermally dissipative material.

Figure 6:
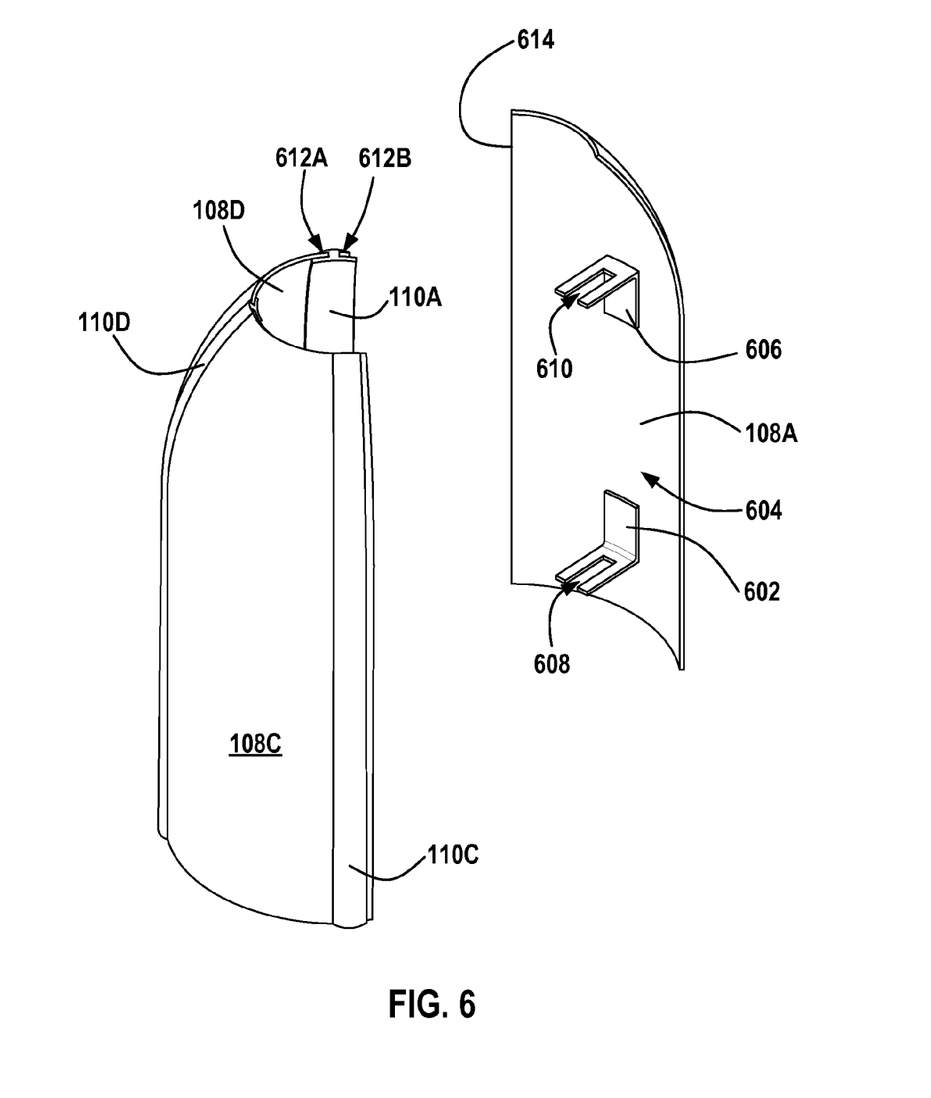
FIG. 6 is a perspective view illustrating charge plates for the early streamer emission terminal, according to an illustrative embodiment.

Turning now to FIG. 6, additional aspects of the emission terminal 100 are illustrated, according to an illustrative embodiment. In particular, FIG. 6 is a perspective view of the charge plates 108A, 108C-D and the seals 110A, 110C-D, according to an illustrative embodiment. In the illustrated embodiment, the inside of the charge plate 108A is visible, as the charge plate 108B and the seal 110B have been removed.

In the illustrated embodiment, the charge plates 108 are formed from anodized aluminum. Because the charge plates 108 are insulated from the shaft 102, the charge plates 108 accumulate atmospheric charge, while the shaft 102 is connected to ground. The charge plates 108 are formed from anodized aluminum, which provides the charge plates 108 with excellent conductivity, by virtue of their composition from aluminum, as well as a durable finish that is resistant to wear from handling, installation, oxidation, and maintenance, by virtue of the anodization process.

The anodization process can be used to provide a finish that is completely bonded with the aluminum, is environmentally friendly, is chemically stable, is non-toxic, and is heat-resistant. In some embodiments, the charge plates 108 are coated with a highly conductive paint. The highly conductive paint can be used to inhibit oxidation and/or corrosion of the charge plates 108, as well as increasing, or at least not decreasing, the overall conductivity of the charge plates 108.

As illustrated in FIG. 6, a lower charge plate mounting bracket 602 ("lower bracket") is connected to or formed at an inner surface 604 of the charge plate 108A. The charge plate 108A also includes an upper charge plate mounting bracket 606 ("upper bracket"). In some embodiments, the lower bracket 602 and the upper bracket 606 are formed from anodized aluminum and coated with highly conductive paint. The lower bracket 602 and the upper bracket 606 can be attached to the charge plate 108A. Depending upon the materials used to form the charge plates 108, the lower bracket 602 and/or the upper bracket 606, the lower bracket 602 and the upper bracket 606 can be attached to the charge plate 108A using a metal inert gas ("MIG") welding process, a tungsten inert gas ("TIG") welding process, a spot-weld process, mechanical fasteners, and/or other mechanisms and processes.

The lower bracket 602 and the upper bracket 606 include respective notches 608, 610. The notch 608 of the lower bracket 602 can engage or can be engaged by one of the lower adjustment mechanisms 316 of the lower assembly 104. Thus, the lower bracket 602 and one of the lower electrodes 314 of the lower assembly 104 can be put into contact with one another using one of the adjustment mechanisms 316. Similarly, the notch 610 of the upper bracket 606 can engage or can be engaged by one of the upper adjustment mechanisms 420 of the upper assembly 202. Thus, the upper bracket 610 and one of the upper electrodes 416 of the upper assembly 202 can be put into contact with one another using one of the upper adjustment mechanisms 420.

The shape of the illustrated charge plates 108 provides a large amount of surface area, relative to the size of the shaft 102. The shape of the charge plates 108 provides a large amount of surface area, thereby allowing the charge plates 108 to store a large atmospheric charge. In general, the atmospheric potential rises rapidly at the charge plates 108 in the moments leading up to a lightning strike. Before the lightning strike occurs, the atmospheric charge gaps or arcs across the lower electrodes 314 and the upper electrodes 416. The charge then moves up the shaft 102, i.e., away from the ground, toward the tip 510 of the shaft 102 and discharges into the atmosphere.

Although not visible in FIG. 6, each of the charge plates 108 can include lower brackets 602 and upper brackets 606. Similarly, the respective lower brackets 602 and upper brackets 606 of the respective charge plates 108 can be engaged by lower adjustment mechanisms 316 and upper adjustment mechanisms 420 of the upper assembly 202 and the lower assembly 104.

In FIG. 6, the seals 110 also are visible. As illustrated in FIG. 6, the seal 110A includes a first groove 612A and a second groove 612B. In some embodiments, each of the seals 110 includes the grooves 612 substantially as illustrated with respect to the seal 110A. The groove 612A receives an edge (not visible) of the charge plate 108D, and the groove 612B receives an edge 614 of the charge plate 108A.

UV light is found in sunlight and also is emitted by electric arcs. UV light is an ionizing radiation that can cause chemical reactions that can break down conventional plastics and other polymers. As such, in some embodiments, the seals 110 are formed from an ultra-violet-resistant ("UV-resistant") plastic. In some embodiments, the seals 110 are formed from silicone polysiloxone. In some embodiments, the seals 110 are formed as pliable UV-resistant plastic strips with grooves 612. Additionally, the material used to form the seals 110 can be an insulator such that each of the charge plates 108 is conductively isolated from one another. As such, the charge plates 108 can function independently from one another with respect to charging and discharging an atmospheric charge.

According to various embodiments, the emission terminal 100 disclosed herein creates an upward streamer in less time relative to traditional lightning rods such as the Franklin rod, or other sharp point objects on the earth. Testing of illustrative embodiments of the emission terminal 100 disclosed herein have demonstrated that various embodiments of the emission terminal 100 are effective at creating a $\Delta_t$ value ranging from twenty to sixty microseconds or more. As is generally known, a $\Delta_t$ value of sixty microseconds translates to a large protection area measuring between a 32 meter and a 109 meter radius zone surrounding the emission terminal 100.

As is now clearly understood, the emission terminal 100 disclosed herein combines a structure and materials that provide a point charge sufficient to generate a corona effect around the emission terminal 100. Generation of a corona effect around the emission terminal 100 results in ionization of air around the emission terminal 100. By ionizing the air around the emission terminal 100, the speed with which the terminal generates an upward streamer increases.

During a thunderstorm or other electrical event, the charge plates 108 of the emission terminal 100 begin to accumulate atmospheric charge. Meanwhile, the shaft 102 is connected to ground. According to various embodiments, a material with a tip radius of curvature R develops a corona streamer when the surface local field is equal to $E_s = E_{ion}(1+k/R^n)$, wherein k=0.127 and n=0.434, the k and n constants depending upon atmospheric conditions. $E_{ion}$, the ionization electric field also depends upon atmospheric conditions. Because the emission terminal 100 has four large-value R charge plates 108, and because the emission terminal 100 has eight different electrode spark gap locations, a higher $E_{ion}$ value is created. Thus, the emission terminal 100 creates a faster launching leader with an expected delta time of between 20 and 60 microseconds.

Based on the foregoing, it should be appreciated that an early streamer emission terminal has been disclosed herein. Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

We claim:

1. An early streamer emission terminal for lightning protection, the early streamer emission terminal comprising:
   two or more charge plates, wherein at least one of the two or more charge plates is formed from a metal;
   two or more insulator seals disposed between at least two of the two or more charge plates to insulate the two or more charge plates from one another;
   an upper assembly comprising an upper aperture and one or more upper electrodes conductively connected to one or more of the charge plates;
   a lower assembly comprising a lower aperture and one or more lower electrodes conductively connected to the one or more of the charge plates; and
   a shaft comprising a sleeve portion and a central electrode portion connected to the sleeve portion, the sleeve portion passing through the upper aperture and the lower aperture.

2. The early streamer emission terminal of claim 1, wherein the metal is aluminum.

3. The early streamer emission terminal of claim 2, wherein at least one of the two or more charge plates is coated with a conductive paint.

4. The early streamer emission terminal of claim 1, wherein the metal is stainless steel.

5. The early streamer emission terminal of claim 1, wherein the two or more charge plates comprise three charge plates, and wherein the lower assembly comprises three lower electrodes, each of the three lower electrodes being conductively coupled to a respective one of the three charge plates.

6. The early streamer emission terminal of claim 1, wherein the two or more charge plates comprise four charge plates, wherein the lower assembly comprises four lower electrodes, each of the four lower electrodes being conductively coupled to a respective one of the four charge plates, and wherein the upper assembly comprises four upper electrodes, each of the four upper electrodes being conductively coupled to a respective one of the four charge plates.

7. The early streamer emission terminal of claim 1, wherein the sleeve portion is formed from metal, wherein at least a portion of the lower assembly is formed from an epoxy resin, and wherein at least a portion of the upper assembly is formed from the epoxy resin.

8. The early streamer emission terminal of claim 7, wherein the sleeve portion is formed from one of stainless steel or aluminum.

9. The early stream emission terminal of claim 1, wherein at least one of the seals comprises a first groove for engaging a first edge of a first of the two or more charge plates, and a second groove for engaging a second edge of a second of the two or more charge plates.

10. The early stream emission terminal of claim 9, wherein at least one of the seals is formed from an ultra-violet-resistant silicone polysiloxone material.

11. The early stream emission terminal of claim 1, wherein at least a portion of the upper assembly or at least a portion of the lower assembly is formed from an epoxy resin comprising a copolyamide.

12. The early stream emission terminal of claim 1, wherein the two or more charge plates are substantially cylindrical, and wherein the tops of the charge plates are tapered toward the shaft.

13. The early streamer emission terminal of claim 1, wherein at least one of the one or more lower electrodes comprises two lower electrode branches, and wherein at least one of the one or more upper electrodes comprises two upper electrode branches.

14. The early streamer emission terminal of claim 13, wherein the lower electrode branches and the upper electrode branches are disposed proximate to, but not touching, the shaft.

15. An early streamer emission terminal for lightning protection, the early streamer emission terminal comprising: four or more charge plates, at least one of the four or more charge plates comprising an upper bracket and a lower bracket; four or more insulator seals, at least one of the four or more insulator seals being located between two of the four or more charge plates to insulate the two of the four or more charge plates from one another; an upper assembly comprising an upper aperture and one or more upper electrodes conductively connected to one of said upper brackets of at least one of the four or more charge plates; a lower assembly comprising a lower aperture and one or more lower electrodes conductively connected to one of said lower brackets of at least one of the four or more charge plates; and a shaft comprising a hollow sleeve portion passing through the upper aperture and the lower aperture, and a central electrode portion connected to the sleeve portion.

16. The early streamer emission terminal of claim 15, wherein the central electrode portion is formed from stainless steel, wherein at least one of the four or more electrodes is formed from a metal, wherein at least a portion of the upper assembly is formed from an epoxy resin, and wherein at least a portion of the lower assembly is formed from the epoxy resin.

17. The early streamer emission terminal of claim 15, wherein at least one of the lower electrodes comprises two lower electrode branches, wherein at least one of the upper electrodes comprises two upper electrode branches, and wherein at least one of the lower electrode branches or the upper electrode branches is located proximate to, but not touching, the shaft.

18. The early stream emission terminal of claim 15, wherein at least one of the upper assembly or the lower assembly is formed from an epoxy resin comprising a copolyamide, wherein at least one of the seals is formed from an ultra-violet-resistant silicone polysiloxone material, wherein at least one of the four or more charge plates is formed from aluminum, and wherein at least a portion of the shaft is formed from steel.

19. An early streamer emission terminal for lightning protection, the early streamer emission terminal comprising: four charge plates, each of the charge plates comprising an upper bracket and a lower bracket, wherein each of the charge plates is formed from a metal; four seals disposed between adjacent charge plates to insulate the adjacent charge plates from one another, each of the four seals being formed from an ultra-violet-resistant silicone polysiloxone material; an upper assembly comprising an upper aperture and four upper electrodes conductively connected to one of said upper brackets of the four charge plates, wherein at least a portion of the upper assembly is formed from an epoxy resin; a lower assembly comprising a lower aperture and four lower electrodes conductively connected to one of said lower brackets of the four charge plates, wherein at least a portion of the lower assembly is formed from an epoxy resin; and a shaft comprising a hollow sleeve portion and a central electrode portion connected to the sleeve portion passing through the upper aperture and the lower aperture.

* * * * *